US009778465B2

(12) United States Patent
Lee et al.

(10) Patent No.: US 9,778,465 B2
(45) Date of Patent: Oct. 3, 2017

(54) METHOD FOR CONTROLLING DISPLAY SCREEN IN HEAD-MOUNTED DISPLAY DEVICE, AND HEAD-MOUNTED DISPLAY DEVICE

(71) Applicant: Samsung Electronics Co., Ltd., Gyeonggi-do (KR)

(72) Inventors: Sang-Young Lee, Gyeonggi-do (KR); Dae-Hyun Kim, Gyeonggi-do (KR); Jin-Ho Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/557,093

(22) Filed: Dec. 1, 2014

(65) Prior Publication Data

US 2015/0153825 A1  Jun. 4, 2015

(30) Foreign Application Priority Data

Nov. 29, 2013  (KR) ........................ 10-2013-0147711

(51) Int. Cl.
| | |
|---|---|
| G09G 5/00 | (2006.01) |
| G02B 27/01 | (2006.01) |
| G06F 1/16 | (2006.01) |
| G06F 3/0354 | (2013.01) |
| G06F 21/31 | (2013.01) |

(52) U.S. Cl.
CPC ....... *G02B 27/0172* (2013.01); *G02B 27/017* (2013.01); *G06F 1/1694* (2013.01); *G06F 3/03547* (2013.01); *G06F 21/31* (2013.01); *G02B 2027/014* (2013.01); *G02B 2027/0178* (2013.01); *G02B 2027/0187* (2013.01)

(58) Field of Classification Search
CPC .... G02B 2027/0198; G02B 2027/0187; G02B 2027/0172–2027/0179; G02B 27/017; G02B 2027/0165; G06F 3/03547; G06F 3/011–3/013; G06F 3/04883; G06K 9/00208; G06K 9/00335; G06K 9/00677; G06K 9/00221
USPC ........................... 345/7–8, 173, 156; 349/11
See application file for complete search history.

(56) References Cited

U.S. PATENT DOCUMENTS

| | | | |
|---|---|---|---|
| 8,223,024 B1 | 7/2012 | Petrou | |
| 8,235,529 B1 | 8/2012 | Raffle | |
| 8,958,158 B1* | 2/2015 | Raffle | .................. G02B 27/017 359/630 |
| 2011/0267321 A1* | 11/2011 | Hayakawa | ......... G02B 27/0093 345/204 |
| 2012/0056847 A1 | 3/2012 | Milford | |
| 2013/0069787 A1* | 3/2013 | Petrou | .................. G02B 27/017 340/573.1 |

(Continued)

FOREIGN PATENT DOCUMENTS

KR  2013-0047474  5/2013

*Primary Examiner* — Jennifer Nguyen
(74) *Attorney, Agent, or Firm* — The Farrell Law Firm, P.C.

(57) ABSTRACT

A method of and device for controlling a head-mounted display device. The method includes detecting a touch input on at least one temple frame provided on the head-mounted display device; detecting movement information of the head-mounted display device; and controlling screen locking of the head-mounted display device according to the touch input on the at least one temple frame and the movement information.

15 Claims, 5 Drawing Sheets

(56) References Cited

U.S. PATENT DOCUMENTS

2015/0220152 A1\* 8/2015 Tait ........................ G06F 3/017
345/156

\* cited by examiner

METHOD FOR CONTROLLING DISPLAY SCREEN IN HEAD-MOUNTED DISPLAY DEVICE, AND HEAD-MOUNTED DISPLAY DEVICE

PRIORITY

This application claims priority under 35 U.S.C. §119(a) to a Korean Application filed on Nov. 29, 2013 in the Korean Intellectual Property Office and assigned Serial No. 10-2013-0147711, the entire contents of which are incorporated herein by reference.

BACKGROUND

1. Field of the Invention

The present disclosure relates generally to a method and an apparatus for controlling the display screen of a Head Mounted Display (MID) device, and more particularly, to a method and an apparatus for controlling the display screen of the HMD device without separate manipulation by the user.

2. Description of the Related Art

Recently, various services and functions provided by portable devices have been expanded gradually. In addition, various applications that can be executed by portable devices also have been developed.

In order to increase the usability of such portable devices and satisfy various user demands, various portable devices have been developed, such as wrist-mounted portable devices and head-mounted portable devices (e.g. head-mounted display devices).

Conventionally, a switch needs to be pressed to operate a display with which a head-mounted portable device is equipped, and such an operation of pressing the switch to turn on the display is inconvenient.

SUMMARY OF THE INVENTION

The present disclosure has been made to address the above-mentioned problems and disadvantages, and to provide at least the advantages described below. Accordingly, an aspect of the present disclosure provides a method of controlling a head-mounted display device. The method includes detecting a touch input on at least one temple frame provided on the head-mounted display device; detecting movement information of the head-mounted display device; and controlling screen locking of the head-mounted display device according to the touch input on the at least one temple frame and the movement information.

According to another aspect of the present disclosure, a head-mounted display device is provided. The device includes a device housing comprising a front frame provided on a front surface of the head-mounted display device and configured to receive at least one window and a plurality of temple frames connected at least to lateral surfaces of the front frame, respectively; an input/output unit configured to detect a user touch input generated on the temple frame; a sensor unit configured to detect motion information of the head-mounted display device; and a control unit configured to control screen locking of the head-mounted display device using the touch input and the motion information.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT INVENTION

Various embodiments of the present disclosure are described more fully with reference to the accompanying drawings in which embodiments of the present disclosure are shown. However, the embodiments do not limit the present disclosure to a specific implementation, but should be construed as including all modifications, equivalents, and replacements included in the spirit and scope of the present disclosure.

Although terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

In the case where a component is referred to as being "connected to" or "accessed by" another component, it should be understood that not only may the component be directly connected to or accessed by the other component, but also, another component may exist between them. Meanwhile, in the case where a component is referred to as being "directly connected to" or "directly accessed by" another component, it should be understood that there is no component therebetween.

The terms used in the present disclosure are for the purpose of describing particular embodiments only and are not intended to limit the disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not exclude the existence or probability of one or more other features, numbers, steps, operations, structural elements, parts, or combinations thereof.

Unless defined differently, all terms used herein, which include technical terminologies or scientific terminologies, have the same meaning as that understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning.

Figure 1A:
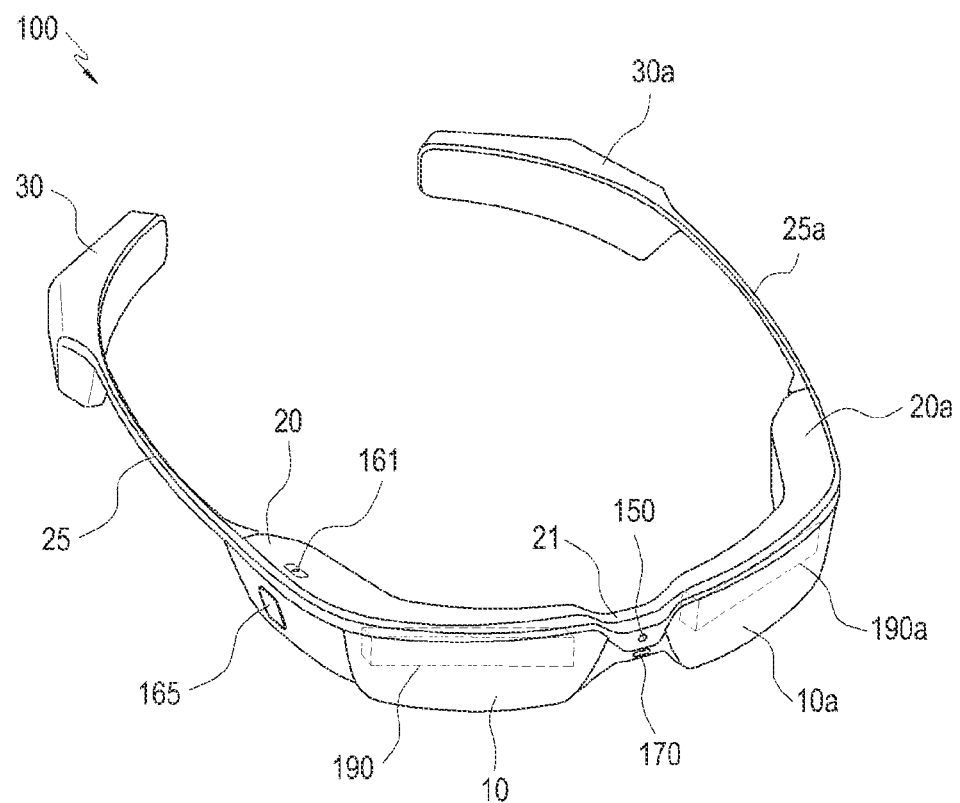
FIG. 1A is a perspective view illustrating a head-mounted display device according to an embodiment of the present disclosure.

FIG. 1A is a perspective view illustrating a head-mounted display device according to an embodiment of the present disclosure.

Referring to FIG. 1A, a Head Mounted Display (HMD) device 100 refers to a display device that is mounted on a user's head. A see-through display unit is positioned in an area adjacent to the user's head (e.g. eyes), and a speaker is positioned in an area adjacent to the user's ears, so that the user is provided with visual information and auditory information. The HMD device 100 includes a glasses-type display device or a helmet-type display device.

The HMD device 100 includes a monocular-type display device having one display unit 190 that displays contents or a binocular-type display device having a plurality of display units 190, 190a that may display three-dimensional images. The binocular-type display device may also selectively operate one display unit of the plurality of display units 190, 190a.

The HMD device 100 includes a first optical lens 10, a first housing 20 containing a part of the first optical lens 10, a second housing 30 including a battery, and a first housing connector 25 (or first temple frame) connecting the first housing 20 and the second housing 30. In addition, the HMD device 100 includes a second optical lens 10a, a third housing 20a containing a part of the second optical lens 10a, a fourth housing 30a including a battery, and a second housing connector 25a (or second temple frame) connecting the third housing 20a and the fourth housing 30a. The battery may also be positioned in the first housing 20, the second housing 30, the third housing 20a, or the fourth housing 30a.

The first housing connector 25 and the second housing connector 25a are flexible and thereby enable the HMD device 100 to be mounted on the user's head.

Furthermore, the first housing 20 and the first housing connector 25 may be connected via a hinge and may be configured so that the first housing connector 25 may be folded inwards or unfolded outwards about the first housing 20. Likewise, the third housing 20a and the second housing connector 25a may also be connected via a hinge and may be configured so that the second housing connector 25a may be folded inwards or unfolded outwards.

The HMD device 100 includes a bridge 21 that connects the first housing 20 and the third housing 20a, where the first housing 20 connected to the third housing 20a by the bridge 21 is referred to as a front frame.

Figure 1B:
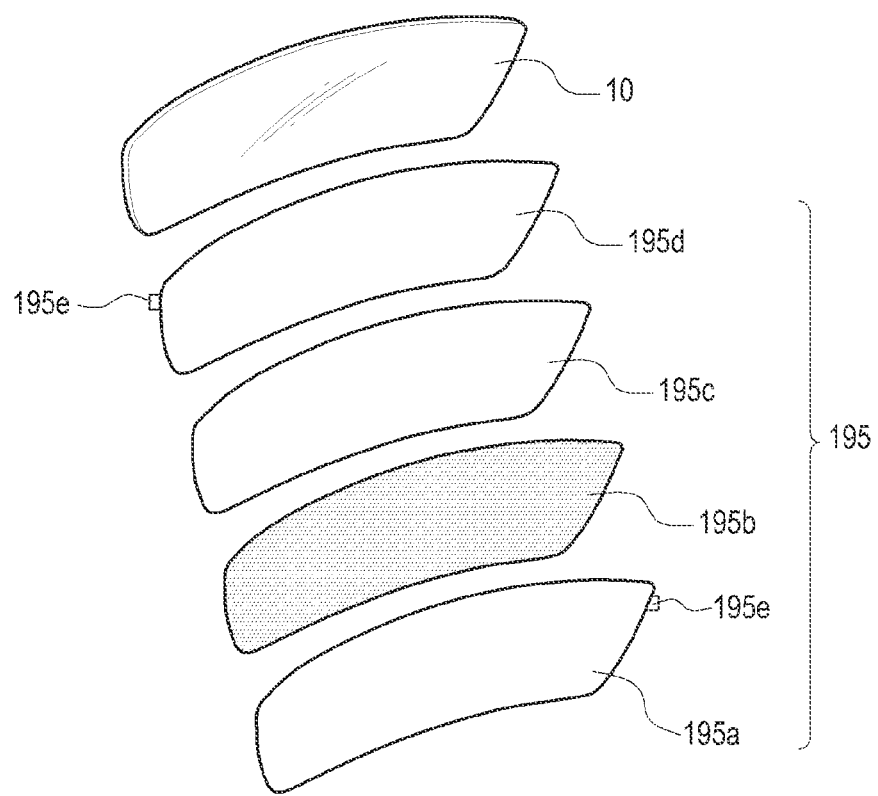
FIG. 1B is a perspective view illustrating a light transmission unit of an HMD device according to an embodiment of the present disclosure.

The HMD device 100 includes a light penetration unit 195 (refer to FIG. 1B). The light penetration unit 195 is coupled to the rear surface of the second optical lens 10a using optical clear adhesive. In addition, the light penetration unit 195 is coupled to the front surface of the first optical lens 10 and the second optical lens 10a, respectively, using an optically clear adhesive.

The display unit 190 or 190a is positioned at a distance (e.g. 5 cm or less) from at least one of the front surface of the first optical lens 10 or the second optical lens 10a, respectively, or positioned at a distance (e.g. 5 cm or less) from the rear surface of the first optical lens 10 or the second optical lens 10a, respectively. Those skilled in the art can easily understand that the distance between the display unit 190 or 190a and the first optical lens 10 or the second optical lens 10a, respectively, may be varied in conformity with the performance or structure of the HMD device 100.

Figure 2:
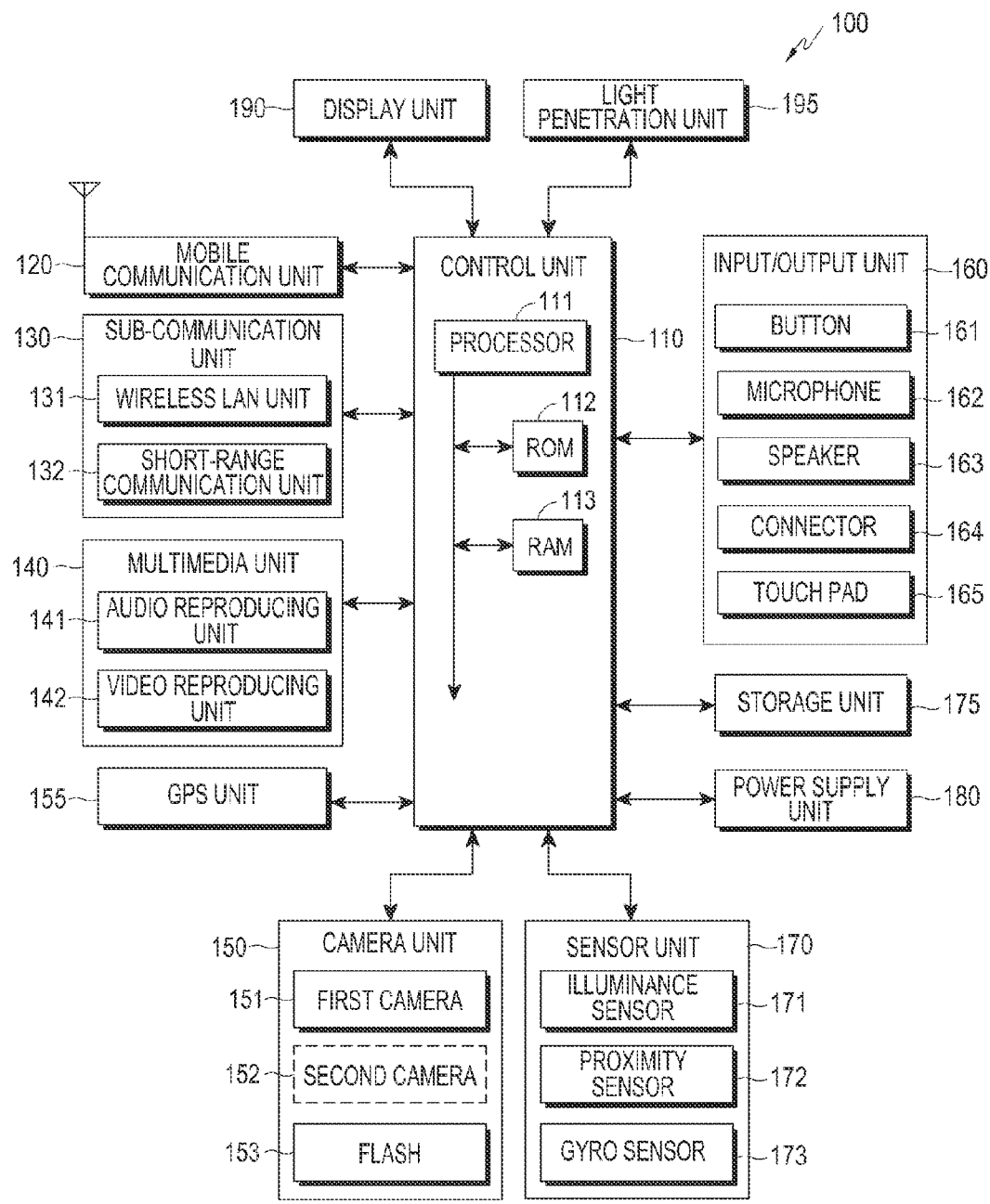
FIG. 2 is a schematic block diagram illustrating an HMD device according to an embodiment of the present disclosure.

The HMD device 100 includes a camera unit 150 (refer to FIG. 2) and a sensor unit 170 (refer to FIG. 2). The camera unit 150 is positioned on at least one of the first housing 20 and the third housing 20a. For example, the camera unit 150 may be positioned on one of the first housing 20 and the third housing 20a or the first camera 151 of the camera unit 150 may be positioned on the first housing 20 and the second camera 152 of the camera unit 150 may be positioned on the third housing 20a. Furthermore, in another embodiment, a third camera of the camera unit 150 may be positioned on the bridge 21.

The sensor unit 170 is positioned on at least one of the first housing 20 and the third housing 20a. For example, the sensor unit 170 may be positioned on one of the first housing 20 and the third housing 20a or the sensors of the sensor unit 170 may be positioned on each of the first housing 20 and the third housing 20a. Furthermore, in another embodiment, a sensor of the sensor unit 170 may be positioned on the bridge 21.

The first housing 20 of the HMD device 100 includes at least one of a button 161 (refer to FIG. 2), a microphone 162 (refer to FIG. 2), a speaker 163 (refer to FIG. 2), a connector 164, and a touch pad 165 (refer to FIG. 2). In an embodiment of the present disclosure, the term "housing" includes at least one of the first housing 20, the second housing 30, the third hosing 20a, and the fourth housing 30a.

Those skilled in the art can easily understand that the positions of the components of the HMD device 100 illustrated in FIG. 1A may be varied in conformity with the performance or structure of the HMD device 100.

FIG. 1B is a perspective view illustrating a light penetration unit 195 of the HMD device 100 according to an embodiment of the present disclosure.

Referring to FIG. 1B, the light penetration unit 195 is coupled to the rear surface of the second optical lens 10a. In addition, the light penetration unit 195 may also be coupled to the front surface of the second optical lens 10a.

The light penetration unit 195 includes a first Indium Tin Oxide (ITO) layer 195a, an electrochromic layer 195b, an electrolyte layer 195c, a second ITO layer 195d, and an electrode 195e. Hereinafter, the Indium Tin Oxide layers will be referred to as ITO layers. The ITO layers may include an ITO film or an ITO glass. In addition, the functions of the ITO layers may be implemented with silver nanowires, copper meshes, silver meshes, silver salts, or silver nanoparticles, which may replace the ITO layers.

The light penetration unit 195 includes a first ITO layer 195a, an electrochromic layer 195b positioned on a top surface of the first ITO layer 195a and configured to change its optical transmittance in response to a supply voltage, an electrolyte layer 195c positioned on a top surface of the electrochromic layer 195b, a second ITO layer 195d positioned on a top surface of the electrolyte layer 195c, and electrodes 195e are connected to the first ITO layer 195a and the second ITO layer 195b, respectively, where the supply voltage is input to the electrodes 195e.

The electrodes 195e may be implemented as clear electrodes. Those skilled in the art can easily understand that the position of each electrode 195e (e.g. right-side upper end of the first ITO layer 195a, left-side upper end of the second ITO layer 195d) may be varied in conformity with the performance or structure of the HMD display device 100.

FIG. 2 is a schematic block diagram illustrating an HMD device according to an embodiment of the present disclosure.

Referring to FIG. 2, the HMD device 100 is connected to an external device in a wired or wireless manner using a mobile communication unit 120, a sub-communication unit 130, and a connector 164. The external device may include a mobile phone including a screen having an area larger than that of the display units 190, 190a, a smart phone, a tablet Personal Computer (PC), a Moving Picture Expert Group Audio Layer 3 (MP3) player, a moving image player, a 3 Dimensional Television (3D-TV), a smart TV, a Light Emitting Diode (LED) TV, a Liquid Crystal Display (LCD) TV, or a server. In addition, the external device may include another HMD device 100.

The MID device 100 includes a device capable of transmitting/receiving data (e.g. images, texts, voices, videos, etc.) using user inputs (or user interactions, e.g. voices, motions, touches, or touch gestures) input via other connectable external devices and HMD devices.

The HMD device 100 includes a display unit 190 and a light penetration unit 195. The HMD device 100 includes a control unit 110, a mobile communication unit 120, a sub-communication unit 130, a multimedia unit 140, a camera unit 150, a Global Positioning System (GPS) unit 155, an input/output unit 160, a sensor unit 170, a storage unit 175, and a power supply unit 180.

The sub-communication unit 130 includes at least one of a wireless Local Area Network (LAN) unit 131 and short-range communication unit 132, and the multimedia unit 140 includes at least one of an audio reproducing unit 141 and a video reproducing unit 142. The camera unit 150 includes at least one of a first camera 151 and a second camera 152, and the input/output unit 160 includes at least one of a button 161, a microphone 162, a speaker 163, a connector 164, and a touch pad 165, and the sensor unit 170 includes an illuminance sensor 171, a proximity sensor 172, and a gyro sensor 173.

The control unit 110 includes a processor 111, a Read-Only Memory (ROM) 112 storing a control program for controlling the HMD device 100, and a Random Access Memory (RAM) 113, which stores signals or data received by the HMD device 100, or which is used as a storage area in connection with various tasks executed by the HMD device 100.

The control unit 110 is configured to control the overall operation of the HMD device 100 and the flow of signals between components 120-195 of the HMD device 100 and process data. The control unit 110 is configured to control power supplied by the power supply unit 180 to the components 120-195. In addition, the control unit 110 executes an Operating System (OS) and various applications, which are stored in the storage unit 175, when conditions that are input by the user, or that have been set and stored, are satisfied.

The processor 111 includes a Graphics Processing Unit (GPU) for graphic processing. The processor 111 may be implemented so that its core and GPU constitute a System on Chip (SoC). The processor 111 may include a single core, a dual core, a triple core, a quad core, and any multiple of cores. In addition, the processor 111, the ROM 112, and the RAM 113 are interconnected via internal buses.

The control unit 110 controls the mobile communication unit 120, the sub-communication unit 130, the multimedia unit 140, the camera unit 150, the GPS unit 155, the input/output unit 160, the sensor unit 170, the storage unit 175, the power supply unit 180, the display unit 190, and the light penetration unit 195.

In an embodiment of the present disclosure, the term "control unit" includes the processor 111, the ROM 112, and the RAM 113.

The control unit 110 detects illuminance, determines an application displayed on the display unit 190 of the HMD device 100, and changes the optical transmittance of the light penetration unit 195 of the HMD device 100 according to an optical transmittance determined in conformity with the application.

In addition, the control unit 110 is configured to control the overall operation of the HMD device 100 and perform a method of controlling the HMD device 100 according to an embodiment of the present disclosure described below.

The mobile communication unit 120 is connected with an external device in a mobile/wireless manner using one or more antennas, under the control of the control unit 110. The mobile communication unit 120 is configured to transmit/receive wireless signals for voice communication, video communication, Short Message Service (SMS), Multimedia Message Service (MMS), and data communication to/from a mobile phone that can connect with the HMD device 100 and has a telephone number, a smart phone, a tablet PC, or another HMD device.

The sub-communication unit 130 includes at least one of a wireless LAN unit 131 and a short-range communication unit 132. For example, the sub-communication unit 130 may include only one of the wireless LAN unit 131 and the short-range communication unit 132 or include both the wireless LAN unit 131 and the short-range communication unit 132.

The wireless LAN unit 131 connects to an Access Point (AP) wirelessly, under the control of the control unit 110, at a place where the AP is installed. The wireless LAN unit 131 supports wireless LAN standards (e.g. IEEE 802.11x) of the Institute of Electrical and Electronics Engineers (IEEE).

The short-range communication unit 132 provides short-range communication between the HMD device 100 and an external device wirelessly, without an AP, under the control of the control unit 110. The short-range communication may include Bluetooth, Bluetooth low energy, Infrared Data Association (IrDA), Wireless Fidelity (Wi-Fi), Ultra Wideband (UWB), Near Field Communication (NFC), etc.

The HMD device 100 includes, depending on its performance, at least one of the mobile communication unit 120, the wireless LAN unit 131, and the short-range communication unit 132. For example, the HMD device 100 may include, depending on its performance, one of the mobile communication unit 120, the wireless LAN unit 131, the short-range communication unit 132 or a combination thereof.

In an embodiment of the present disclosure, the term "communication unit" includes the mobile communication unit 120 and the sub-communication unit 130.

The mobile communication unit 120, according to an embodiment of the present disclosure, connects the HMD device 100 to an external device under the control of the control unit 110. The mobile communication unit 120 transmits data or content to an external device under the control of the control unit 110. In addition, the mobile communication unit 120 transmits/receives data to/from an external device under the control of the control unit 110. In addition, the mobile communication unit 120 receives illuminance from an external device under the control of the control unit 110.

The multimedia unit 140 includes an audio reproducing unit 141 or a video reproducing unit 142.

The audio reproducing unit 141 reproduces audio sources (e.g. audio files having filename extensions of Moving Picture Expert Group Audio Layer 3 (mp3), Windows Media Audio (wma), Operation Good Guys (ogg), or Waveform Audio File (wav)), which are pre-stored in the storage unit 175 of the HMD device 100 or received externally, using an audio Compression/Decompression (codec) unit, under the control of the control unit 110.

The audio reproducing unit 141, according to an embodiment of the present disclosure, reproduces auditory feedback (e.g. output of audio sources stored in the storage unit 175), which corresponds to a change of optical transmittance of the light penetration unit 195, using the audio codec unit under the control of the control unit 110.

The video reproducing unit 142 reproduces digital moving image sources (e.g. files having filename extensions of Moving Picture Expert Group (mpeg or mpg), MPEG Audio Layer 4 (mp4), Audio Video Interleave (avi), Quick Time Movie (mov), Small Web Format (swf), Macromedia Flash (fla), or Matroska Video Format (mkv)), which are pre-stored in the storage unit 175 of the HMD device 100 or received externally, using video codec unit under the control of the control unit 110. Most reproduction applications that can be executed by the HMD device 100 can reproduce audio sources or moving image files using the audio codec unit or the video codec unit. In addition, most reproduction applications that can be executed by the HMD device 100 can reproduce audio sources or still image files.

The video reproducing unit 142, according to an embodiment of the present disclosure, reproduces visual feedback (e.g. output of moving image sources stored in the storage unit 175), which corresponds to a change of optical transmittance of the light penetration unit 195, using the video codec unit under the control of the control unit 110.

Those skilled in the art can easily understand that various types of video and audio codec units are being produced and sold.

The audio reproducing unit 141 or the video reproducing unit 142 of the multimedia unit 140 may be included in the control unit 110. In an embodiment of the present disclosure, the term "video codec unit" may include one or more video codec units. In addition, in an embodiment of the present disclosure, the term "audio codec unit" may include one or more audio codec units.

The camera unit 150 is configured to take still or moving images in the direction of gazing of the user under the control of the control unit 110. The camera unit 150 may be positioned on at least one of the bridge 21, the first housing 20, and the third housing 20a. For example, the camera unit 150 may be positioned on one of the bridge 21, the first housing 20, and the third housing 20a, or the camera unit 150 may be positioned on a plurality of the bridge 21, the first housing 20, and the third housing 20a. When the HMD device 100 includes one camera, it includes a first camera 151. When the HMD device 100 includes two cameras, it includes a first camera 151 and a second camera 152.

The HMD device 100 may include a third camera positioned on one of the second housing 30 and the fourth housing 30a of the HMD device 100 and configured to take still or moving images of objects behind the user. In addition, the first camera 151 or the second camera 152 may include an auxiliary light source (e.g. flash 153) that provides the amount of light necessary for photography.

When the first camera 151 and the second camera 152 are positioned adjacent to each other (e.g. when the distance between the first camera 151 and the second camera 152 is between 2 cm and 8 cm), the first camera 151 and the second camera 152 takes three-dimensional still or moving images under the control of the control unit 110. In addition, one of the first camera 151 and the second camera 152 can conduct wide-angle, telescopic, and close-up photography using a separate adapter.

The camera unit 150 according to an embodiment of the present disclosure takes still or moving images of objects around the HMD device 100 and transmit the taken images to the control unit 110. The control unit 110 transmits the received still or moving images externally using the mobile communication unit 120. In addition, the control unit 110 calculates the peripheral illuminance of the HMD device 100 using the received still or moving images.

The GPS unit 155 is configured to periodically receive information (e.g. information regarding the accurate position and time of GPS satellites that the HMD device 100 can receive) from a plurality of GPS satellites orbiting the earth. The HMD device 100 determines the current position, moving rate, or time of the HMD device 100 using the information received from the plurality of GPS satellites.

The input/output unit 160 includes one or more buttons 161, one or more microphones 162, one or more speakers 163, one or more connectors 164, and one or more touch pads 165.

Referring to the HMD device 100 illustrated in FIG. 1A, FIG. 1B, and FIG. 2, the button 161 includes a power/locking button 161a positioned on the first housing 20. The button 161 may include a home button on the first housing 20. In addition, the button 161 on the housing of the HMD device 100 may be implemented not only as a physical button, but also as a touch button.

The microphone 162 is configured to receive external voices or sounds and generate electrical signals under the control of the control unit 110. The electrical signals generated by the microphone 162 are converted by the audio codec unit and stored in the storage unit 175 or output via the speaker 163. One or more microphones 162 may be positioned on the first housing 20 or the third housing 20a of the HMD device 100. In addition, one or more microphones 162 may be positioned on the second housing 30 or the fourth housing 30a of the HMD device 100.

The speaker 163 outputs sounds, which correspond to various contents (e.g. wireless signals, broadcasting signals, audio sources, moving image files, or picture taking) of the mobile communication unit 120, the sub-communication unit 130, the multimedia unit 140, the camera unit 150, or an application, externally from the HMD device 100 using the audio codec unit under the control of the control unit 110. The speaker 163 outputs sounds corresponding to functions performed by the HMD device 100 (e.g. touch manipulation sound corresponding to telephone number input or picture taking button manipulation sound).

At least one speaker 163 may be positioned on a housing of the HMD device 100. Referring to the HMD device 100 illustrated in FIG. 1A, FIG. 1B, and FIG. 2, the speaker 163 may be positioned in an area of a housing of the HMD device 100 (e.g. in an area sufficiently near the user's ear to receive sounds). In addition, the speaker 163 of the HMD device 100 may include an air conduction speaker or a bone conduction speaker.

The speaker 163, according to an embodiment of the present disclosure, outputs auditory feedback corresponding to a change of optical transmittance of the light penetration unit 195, under the control of the control unit 110.

The connector 164 connects the HMD device 100 to an external device or a power source. The HMD device 100 transmits data, which is stored in the storage unit 175, through a wired cable connected to the connector 165 or receives data from an external device under the control of the control unit 110. The HMD device 100 receives power from a power source via a wired cable connected to the connector 164 or a charge from its battery.

The touch pad 165 is configured to receive user inputs (e.g. touch, touch and drag) for controlling the HMD device 100. The touch pad 165 has a sensor embedded in a flat plate (e.g. polygon, circle, ellipse, or rounded rectangle). The touch pad 165 may be selectively provided on at least one of the first to fourth housings 20, 30, 20a, 30a, the first and second housing connectors 25, 25a, and the bridge 21, with which the HMD device 100 is equipped, or provided on all of the first to fourth housings 20, 30, 20a, 30a, the first and second housing connectors 25, 25a, and the bridge 21. Furthermore, the touch pad 165 may be positioned on outer surfaces of the first to fourth housings 20, 30, 20a, 30a, the first and second housing connectors 25, 25a, and the bridge 21, in order to make it easier for the user to provide inputs.

User inputs using the touch pad 165 are not limited to contacts by the user's body or any input unit capable of touching (e.g. stylus pen), but also include non-contact inputs (e.g. hovering that has a detectable distance of 20 mm or less between the touch pad 165 and the user's body or between the touch pad 165 and the input/output unit 160). Those skilled in the art can easily understand that the non-contact distance that can be detected by the touch pad 165 can be varied in conformity with the performance or structure of the HMD device 100.

The HMD device 100 includes one of a trackball and a pointing stick, which are compatible with the touch pad 165.

The sensor unit 170 includes at least one sensor capable of detecting the state or peripheral state of the HMD device 100. For example, the sensor unit 170 may be positioned on the front surface or lateral surface of a housing of the HMD device 100 of the user, and, specifically, it can be provided on at least one of the first to fourth housings 20, 30, 20a, 30a, the first and second housing connectors 25, 25a, and the bridge 21. The sensor unit 170 includes an illuminance sensor 171 capable of detecting the amount of light in the periphery of the HMD device 100, a proximity sensor 172 capable of detecting whether another object is in proximity to the HMD device 100, a gyro sensor 173 capable of detecting the inclination of the HMD device 100 using rotational inertia of the HMD device 100, an acceleration sensor capable of detecting the state of movement of three axes (e.g. x-axis, y-axis, z-axis) established with regard to the HMD device 100, a gravity sensor capable of detecting the direction of gravity, or an altimeter capable of detecting an altitude by measuring the atmospheric pressure.

The illuminance sensor 171, according to an embodiment of the present disclosure, is configured to detect the peripheral illuminance of the HMD device 100. The illuminance sensor 171 transmits an illuminance signal, which corresponds to the detected illuminance, to the control unit 110 under the control of the control unit 110.

The plurality of sensors included in the sensor unit 170 may be implemented as separate chips or as a single chip (e.g. six-axis sensor including a geomagnetic sensor and an acceleration sensor, or a nine-axis sensor including a geomagnetic sensor, an acceleration sensor, and a gyro sensor).

Those skilled in the art can easily understand that the sensors of the sensor unit 170 may be added or omitted in conformity with the performance of the HMD device 100.

The storage unit 175 stores signals or data inputted/outputted in conformity with operations of the mobile communication unit 120, the sub-communication unit 130, the multimedia unit 140, the camera unit 150, the GPS unit 155, the input/output unit 160, the sensor unit 170, the display unit 190, or the light penetration unit 195 under the control of the control unit 110. The storage unit 175 stores a control program for controlling the HMD device 100 or the control unit 110, a Graphical User Interface (GUI) related to applications provided by the manufacturer or externally downloaded, images to be provided to the GUI, user information, documents, databases, or relevant data.

In an embodiment of the present disclosure, the term "storage unit" includes a storage unit 175, a ROM 112 inside the control unit 110, a RAM 113, or a memory card (e.g., a micro SD card, a memory stick) that can be mounted on the HMD device 100. The storage unit 175 may include a non-volatile memory, a volatile memory, a Hard Disc Drive (HDD), or a Solid State Drive (SSD).

The storage unit 175, according to an embodiment of the present disclosure, stores commands displayed on the display unit 190, command lists, notifications, texts (e.g. Yes, No), icons, objects, application screen images, contents displayed on application screen images, screen data, or various sub-screen images.

The storage unit 175 stores application specification files including various information related to the name and configuration of applications (e.g. when the OS is Android, the application specification file is a manifest file (AdroidManifest.xml)). In addition, the storage unit 175 stores a program manager (e.g. activity manager or package manager).

The storage unit 175 stores user inputs (e.g. user voices (e.g. received through the microphone 162)), user motions (e.g. motions that can be detected through the sensor unit 170), user touches (e.g. touches received through the button 161), or user's touch gestures (e.g. touches that can be detected through the touch pad 165, including flicks or swipes).

The power supply unit 180 supplies electrical power to one or more batteries positioned in the HMD device 100. One or more batteries may be positioned in the second housing 30 and the fourth housing 30a. In addition, the power supply unit 180 supplies the HMD device 100 with electrical power, which is input from an external power source via a wired cable connected to the connector 165, under the control of the control unit 110. In addition, the power supply unit 180 supplies the HMD device 100 with electrical power through wireless charging (e.g. magnetic resonance type, electromagnetic wave type, or magnetic induction type) under the control of the control unit 110.

The display unit 190 is a see-through display unit capable of providing the user with GUIs corresponding to various services (e.g. video communication, data transmission, still image taking, moving image taking, or screen images of executed applications). The display unit 190 provides the user with GUIs corresponding to user inputs that are input through the button 161, the microphone 162, the touch pad 165, and the sensor unit 170.

The display unit 190 may include a micro display and an optical system. The display unit 190 projects images, which are displayed on the micro display (e.g., LCD or Organic Light Emitting Diode (OLED)), onto the user's eyes through an optical system (e.g. free curved surface optical system) including a lens and a waveguide.

The micro display may include display panels of an LCD type, an OLED type, an Active Matrix Organic Light Emitted Diode (AMOLED), etc.

A monocular-type display device includes one display unit 190 that displays contents. A binocular-type display device includes a plurality of display units 190, 190a capable of displaying three-dimensional images.

The light penetration unit 195 adjusts the optical transmittance, with regard to transmitted light, in conformity with a supply voltage or supply current. The light penetration unit 195 is coupled to the front or rear surface of the optical lens 10 using optically clear adhesive. In addition, the light penetration unit 195 may be coupled to the front surface of the optical system of the display unit 190 using optically clear adhesive.

The optical transmittance of the light penetration unit 195 may be adjusted, according to the supply voltage (or supply current) that is supplied to the optical transmission unit 195, to be close to about 100% and transmit the majority of light or to be close to about 0% and block the majority of light.

The supply voltage may be adjusted so that the optical transmittance of the light penetration unit 195 has a value between 0% and 100% under the control of the control unit. The optical transmittance according to an embodiment of the present disclosure may have a value between 5% and 95% under the control of the control unit 110. The optical transmittance, according to another embodiment of the present disclosure, may have a value between 10% and 80% under the control of the control unit 110. Light that is incident in conformity with the optical transmittance passes through the light penetration unit 195, and the remaining light is reflected by the light penetration unit 195.

Figure 3:
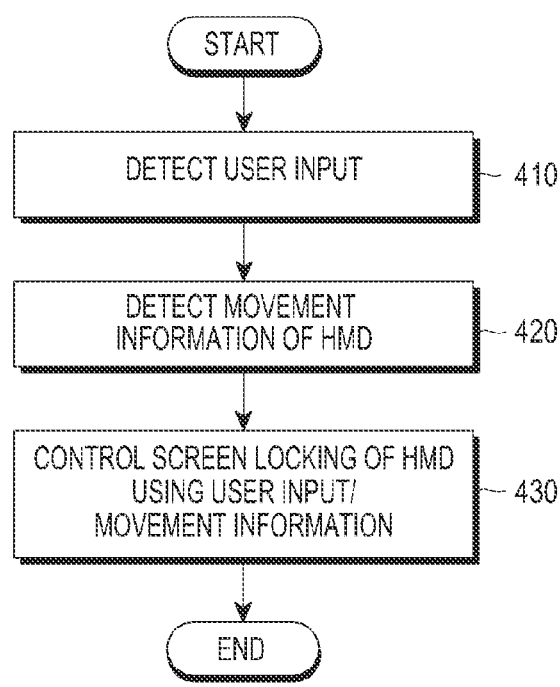
FIG. 3 is a flowchart illustrating a method of controlling an HMD device according to an embodiment of the present disclosure.

FIG. 3 is a flowchart illustrating a method of controlling an HMD device 100 according to an embodiment of the present disclosure.

Referring to FIG. 3, the method of controlling an HMD device 100 includes a step 410 of detecting whether the user's touch input is generated on a housing (e.g. first housing 20, third housing 20a, first housing connector 25, second housing connector 25a, bridge 21, etc.), with which the HMD device 100 is provided; a step 420 of determining movement information of the HMD device 100; and a step 430 of controlling the screen locking of the HMD device 100 using the touch input on the at least one frame and the movement information.

To mount or remove the HMD device 100, the user must move the HMD device 100 while holding the housing (specifically, first housing 20, third housing 20a, first housing connector 25, second housing connector 25a, bridge 21, etc.) of the HMD device 100. Therefore, the housing (specifically, first housing 20, third housing 20a, first housing connector 25, second housing connector 25a, bridge 21, etc.) of the HMD device 100 is provided with a touch pad 165 to determine whether the user is holding the housing (specifically, first housing 20, third housing 20a, first housing connector 25, second housing connector 25a, bridge 21, etc.). In step 410, the control unit 110 detects whether the user is holding the housing of the HMD device 100 based on a signal input via the touch pad 165 provided on the housing (specifically, first housing 20, third housing 20a, first housing connector 25, second housing connector 25a, bridge 21, etc.).

In step 420 of detecting movement information of the HMD device 100, the information is detected based on a signal provided via the sensor unit 170 and the like. The movement information may include the direction of movement of the HMD device 100, the distance of movement, etc. For example, the sensor unit 170 detects and provides the direction of movement of the HMD device 100 and acceleration information regarding the direction of movement (e.g., gravitational direction or opposite gravitational direction, etc.). Accordingly, the control unit 110 detects the rate of movement of the HMD device and the time of movement, based on the acceleration information, and confirms the distance of movement based thereon.

Furthermore, the control unit 110 conducts operations of step 410 of detecting the movement information, based on the user touch input, in step 430. For example, the control unit 110 may initiate the sensor unit 170 only when a touch input is detected through the touch pad 165 provided on the housing (specifically, first housing 20, third housing 20a, first housing connector 25, second housing connector 25a, bridge 21, etc.). As such, the touch pad 165 detects whether the user's touch input has occurred and then controls operations of the sensor unit 170 for determining whether the HMD device 100 has been mounted or removed, thereby avoiding any unnecessary operation of the sensor unit 170 and minimizing power consumption.

Furthermore, although it has been assumed in an embodiment of the present disclosure that step 410 of detecting a touch input is followed by step 420 of determining movement information, the present disclosure is not limited thereto. For example, it is also possible to perform the step 420 of determining movement information and then step 410 of detecting touch inputs. Furthermore, when performing step 420 of determining movement information and then step 410 of detecting touch inputs as described above, the control unit 110 may process step 410 of detecting touch inputs when the movement information indicates that the distance of movement has exceeded a predetermined threshold. For example, the control unit 110 may initiate operation of the touch pad 165 when the movement information indicates that a movement vector value, which corresponds to a movement in the gravitational direction or in the opposite gravitational direction, exceeds a predetermined threshold. Such control of operations of the touch pad 165 for the purpose of determining whether the HMD device 100 has been mounted or removed avoids unnecessary operation of the touch pad 165 and minimizes power consumption.

In step 430 of controlling the screen locking of the HMD device 100, the screen locking is controlled according to whether the user has donned or removed the HMD device 100.

The confirmation of whether the user has donned or removed the HMD device 100 is made at least based on the movement information. For example, when a user who is not wearing a HMD device 100 wants to wear one, the user must move the HMD device 100 a predetermined distance in the opposite gravitational direction, while grasping a part of the housing of the HMD device 100, and position it near the user's head. As used herein, the predetermined distance refers to a distance set to confirm whether an HMD device 100 is mounted, and can be set based on consideration of the habit or environment of wearing the HMD device 100, for example. An example of the habit or environment of hearing an HMD device 100 is as follows: a user is sitting on a chair or is standing up, an HMD device 100 is placed on a desk, and the user grasps and wears the HMD device 100. Another example is as follows: a user is sitting on a chair or is standing up while wearing an HMD device 100; the user then grasps and removes the HMD device 100 and places it on the desk. Therefore, the predetermined distance may be set based on consideration of the user's average height, average height of the desk, and the like. In addition, the above-mentioned average height of the user, average height of the desk, and the like may also be set based on consideration of the user's height, sitting height, the HMD device's 100 normal position, and the like. Furthermore, movement of the predetermined distance may be detected using acceleration or movement direction information, for example, which is included in the movement information.

Considering this, the control unit 110 can determine that the user has worn an HMD device 100 when the user, who has not been wearing an HMD device 100, grasps a part of the housing of the HMD device 100, the resulting touch input is detected, and corresponding movement information of the HMD device 100 indicates that it has moved a predetermined distance in the opposite gravitational direction. In response to such a determination, the control unit 110 releases the screen locking of the HMD device 100 so that the user can use the HMD device 100.

When a user who wears an HMD device 100 wants to remove the HMD device 100, the user must move the HMD device 100 a predetermined distance in the gravitational direction, while grasping a part of the housing of the HMD device 100, and position it away from the user's head. Therefore, the control unit 110 can determine that the HMD device 100 has been removed from the user when the user, who has been wearing the HMD device 100, grasps a part of the housing of the HMD device 100, the resulting touch input is detected, and corresponding movement information of the HMD device 100 indicates that it has moved a predetermined distance in the gravitational direction. In response to such a determination, the control unit 110 releases the screen locking of the HMD device 100.

In addition, in step 430 of controlling the screen locking of the HMD device, a change of the unfolded or folded state of the first housing connector 25 and the second housing connector 25a may be reflected to control the screen locking of the HMD device 100. To this end, step 430 of controlling the screen locking of the HMD device 100 may further include a step of confirming the unfolding or folding state of the first housing connector 25 and the second housing connector 25a and a step of reflecting the unfolded or folded state of the first housing connector 25 and the second housing connector 25a to control the screen locking of the HMD device 100.

For example, it can be determined that the user has worn an HMD device 100 when the movement information of the HMD device 100 indicates that it has moved a predetermined distance in the opposite gravitational direction while the first housing connector 25 and the second housing connector 25a are in the unfolded state (or when switched from the folded state to the unfolded state). In response to such a determination, the control unit 110 releases the screen locking of the HMD device 100 so that the user can use the HMD device 100. As another example, it can be determined that the user has worn an HMD device 100 when the movement information of the HMD device 100 indicates that it has moved a predetermined distance in the opposite gravitational direction and remains in a stabilized state without any movement for a predetermined time while the first housing connector 25 and the second housing connector 25a are in the unfolded state (or when switched from the folded state to the unfolded state).

In addition, it can be determined that the user has removed the HMD device 100 when the movement information of the HMD device indicates that it has moved a predetermined distance in the gravitational direction and when the first housing connector 25 and second housing connector 25a are in the folded state (or switched from the unfolded state to the folded state). In response to such a determination, the control unit 110 releases screen locking of the HMD device 100.

As another example, it can be determined that the user has removed the HMD device 100 when the movement information of the HMD device 100 indicates that it has moved a predetermined distance in the gravitational direction and when the first housing connector 25 and the second housing connector 25a have reached the folded state (or switched from the unfolded state to the folded state) and remain in a stabilized state without any movement for a predetermined time. In response to such a determination, the control unit 110 releases screen locking of the HMD device 100.

Meanwhile, the control unit 110 initiates operation of the display unit 190 and provides the left and right eyes of the user with projection light, which forms virtual images, through the light penetration unit 195, so that the user is provided with images via the HMD device 100. Therefore, in various embodiments of the present disclosure, the screen locking of the HMD device 100 may be an operation of blocking projection light output from the display unit 190. In addition, release of screen locking of the HMD device 100 may be an operation of providing the left and right eyes of the user with projection light output from the display unit 190.

Figure 4:
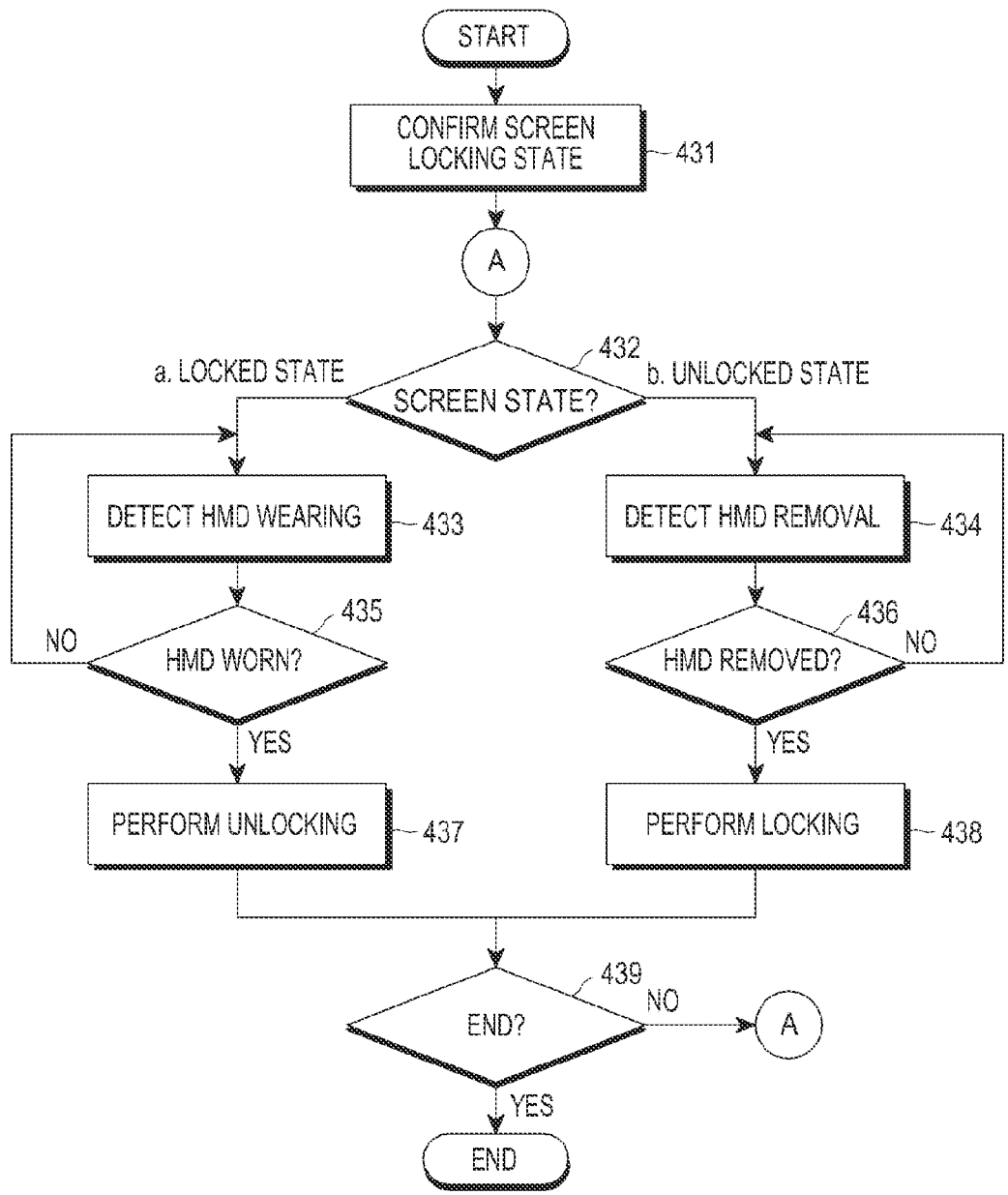
FIG. 4 is a flowchart illustrating a method of locking or unlocking a screen in an HMD device according to an embodiment of the present disclosure.

FIG. 4 is a flowchart illustrating a detailed configuration of a screen locking control process of an HMD device control method according to an embodiment of the present disclosure.

Referring to FIG. 4, in step 431, the control unit 110 determines the current screen state of the HMD device 100. The screen state of the HMD device 100 may be, for example, a locked state or an unlocked state.

When the screen state of the HMD device 100 is a locked state (step 432-a), the HMD device 100 may not be worn by the user. Therefore, the control unit 110 uses the movement information and determines whether the HMD device 100 is worn by the user (step 433). When it is determines in step 433 that the HMD device 100 is worn by the user (step 435-Yes), the control unit 110 releases the screen locking of the HMD device 100 (step 437).

Determination of whether the HMD device 100 is worn by the user can be variously made using the user's touch input, movement information, and the like.

For example, in order to wear the HMD device 100, the user must move the HMD device 100 towards the user's head. This means that the HMD device is moved in the opposite gravitational direction. Therefore, the control unit 110 can determine that the HMD device 100 has been worn by the user when the movement information of the HMD device 100 indicates that it has moved in the opposite gravitational direction.

As another example, when the user wears an HMD device 100, the HMD device 100 may remain in a stably mounted state without any movement after being worn by the user. Reflecting this, the control unit 110 can determine that the movement information, which is measured by a motion sensor, indicates that the HMD device 100 has moved a predetermined distance in the opposite gravitational direction and then remains in a stabilized state without any movement for a predetermined time and thereby confirm that the HMD device 100 has been worn by the user.

As another example, in order to wear the HMD device 100, the user needs to move the HMD device 100 while holding the housing (specifically, first housing 20, third housing 20a, first housing connector 25, second housing connector 25a, bridge 21, etc.) of the HMD device 100. In this case, the HMD device 100 must be moved towards the user's head, meaning that it is moved in the opposite gravitational direction. Therefore, the control unit 110 detects whether the user's touch input has occurred by using the touch sensor provided on the housing (specifically, first housing 20, third housing 20a, first housing connector 25, second housing connector 25a, bridge 21, etc.) of the HMD device 100. When the user's touch input has occurred, the control unit 110 can determine that the HMD device 100 has been worn by the user as the movement information of the HMD device 100 indicates that it has moved in the opposite gravitational direction.

Furthermore, the control unit 110 determines whether the user's touch input has occurred by using the touch sensor provided on the housing (specifically, first housing 20, third housing 20a, first housing connector 25, second housing connector 25a, bridge 21, etc.) of the HMD device 100. When the user's touch input has occurred, the control unit 110 can determines that the movement information of the HMD device 100 indicates that it has moved in the opposite gravitational direction and remains in a stabilized state without any movement for a predetermined time and thereby determines that the HMD device 100 has been worn by the user.

On the other hand, the first housing connector 25 and the second housing connector 25a, with which the HMD device 100 is provided, may remain folded in the direction of provision of the first housing 20 and the third housing 20a, or remain unfolded in the opposite direction. When the HMD device 100 is not used, the first housing connector 25 and the second housing connector 25a may be stored while being folded in the direction of provision of the first housing 20 and the third housing 20a. In addition, the first housing connector 25 and the second housing connector 25a, which have been stored in a folded state when the HMD 100 is used, may remain unfolded while being approximately perpendicular to the first housing 20 and the third housing 20a. Therefore, together with the above-described various embodiments of determining that the HMD device 100 has been worn by the user based on movement information, it is also possible to further reflect the folded state or unfolded state of the first housing connector 25 and the second housing connector 25a to determine that the HMD device 100 has been worn. For example, the control unit 110 may conduct the operation of determine that the HMD device 100 has been worn by the user when the movement information indicates that it has been moved in the opposite gravitational direction, provided that sensors, which detect the state of hinges connecting the first and second housing connectors 25, 25a and the first and third housings 20, 20a, switches, or the like indicate that the first and second housing connectors 25, 25a have been unfolded.

Meanwhile, when the screen state of the HMD device 100 is an unlocked state (step 432-b), the HMD device 100 may have been worn by the user and used. Therefore, the control unit 110 uses the movement information and determines whether the HMD device 100 is removed from the user (step 434). When it is confirmed in step 434 that the HMD device 100 is removed from the user (step 436-Yes), the control unit 110 performs the screen locking of the HMD device 100 (step 438).

Confirmation of whether the HMD device 100 is removed from the user can be variously made using the user's touch input, movement information, and the like.

For example, after removing the HMD device 100, the user stores it in a pocket or on a table, since the HMD device 100 is not worn any longer. This means that the HMD device 100 may be moved in the gravitational direction, i.e., towards a position lower than the user's head. Therefore, the control unit 110 can determine that the HMD device 100 has been removed from the user when the movement information of the HMD device 100 indicates that it has moved in the gravitational direction.

As another example, when the user removes the HMD device 100, the HMD device 100 may remain stably stored in a pocket or on a table, for example, without any movement after being removed from the user. Reflecting this, the control unit 110 may determines that the movement information, which is measured by a motion sensor, indicates that the HMD device 100 has moved a predetermined distance in the gravitational direction and then remains in a stabilized state without any movement for a predetermined time and thereby determine that the HMD device 100 has been removed from the user.

As another example, in order to remove the HMD device 100, the user must move the HMD device 100 while holding the housing (specifically, first housing 20, third housing 20a, first housing connector 25, second housing connector 25a, bridge 21, etc.) of the HMD device 100. In this case, the HMD device 100 must be moved to a position lower than the user's head, meaning that it is moved in the gravitational direction. Therefore, the control unit 110 detects whether the user's touch input has occurred by using the touch sensor provided on the housing (specifically, first housing 20, third housing 20a, first housing connector 25, second housing connector 25a, bridge 21, etc.) of the HMD device 100. When the user's touch input has occurred, the control unit 110 can determine that the HMD device 100 has been removed from the user as the movement information of the HMD device 100 indicates that it has moved in the gravitational direction.

Furthermore, the control unit 110 detects whether the user's touch input has occurred by using the touch sensor provided on the housing (specifically, first housing 20, third housing 20a, first housing connector 25, second housing connector 25a, bridge 21, etc.) of the HMD device 100. When the user's touch input has occurred, the control unit 110 may determine that the movement information of the HMD device 100 indicates that it has moved in the gravitational direction and remains in a stabilized state without any movement for a predetermined time and thereby determine that the HMD device 100 has been removed from the user.

Meanwhile, the first housing connector 25 and the second housing connector 25a of the HMD device 100 may remain folded in the direction of provision or unfolded in the opposite direction so that, when the HMD device 100 is not used, the first housing connector 25 and the second housing connector 25a may be stored while being folded in the direction of provision of the first housing 20 and the third housing 20a. Therefore, together with the above-described various embodiments of determining that the HMD device 100 has been removed from the user based on movement information, it is also possible to further reflect the folded state or unfolded state of the first housing connector 25 and the second housing connector 25a to determine that the HMD device 100 has been removed. For example, the control unit 110 may determine that the HMD device 100 has been fully removed from the user, provided that sensors, which detect the state of hinges connecting the first and second housing connectors 25, 25a and the first and third housings 20, 20a, switches, or the like indicate that the first and second housing connectors 25, 25a have been folded.

According to various embodiments of the present disclosure described above, it is possible to determine whether an HMD device 100 is worn by or removed from a user and thereby process screen locking or screen unlocking automatically. This enables the user to actively process screen locking or screen unlocking of the HMD device 100 without separately manipulating the HMD device 100 for the purpose of screen locking or screen unlocking.

It will be appreciated that the exemplary embodiments of the present disclosure may be implemented in a form of hardware, software, or a combination of hardware and software. Any such software may be stored, for example, in a volatile or non-volatile storage device such as a ROM, a memory such as a RAM, a memory Integrated Circuit (IC) or chip, a memory device, or a recordable optical or magnetic medium such as a Compact Disc (CD), a Digital Video Disc (DVD), a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure. Accordingly, the present disclosure includes a program for a code implementing the apparatus and method described in the appended claims of the specification and a non-transitory machine (a computer or the like)-readable storage medium for storing the program. Further, the program may be electronically transferred by a predetermined medium such as a communication signal transferred through a wired or wireless connection, and the present disclosure appropriately includes equivalents of the program.

Also, the computer or the electronic device may receive and store a program from a device for providing a program, to which the computer or the electronic device is connected by wire or wirelessly. The device for providing a program may include a memory that stores a program including instructions which instruct the electronic device to perform a previously-set method for outputting a sound, information required for the method for outputting a sound, and the like; a communication unit that performs wired or wireless communication; and a controller that controls the transmission of a program. When receiving a request for providing the program from the computer or the electronic device, the device for providing a program may provide, by wire or wirelessly, the program to the computer or the electronic device. Even when the computer or the electronic device does not send the request for providing the program to the device for providing a program, for example, when the computer or the electronic device is located within a particular place, the device for providing a program may be configured to provide, by wire or wirelessly, the program to the computer or the electronic device.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. A method of controlling a head-mounted display device, the method comprising:
   determining whether a user of the head-mounted display device is holding the head-mounted display device based on a touch input on the head-mounted display device;
   detecting movement information of the head-mounted display device while the user is holding the head-mounted display device;
   controlling the head-mounted display device to be unlocked state based on the movement information; and
   releasing a locked state of the head-mounted display device in response to wearing of the head-mounted display device by the user,
   wherein releasing the locked state of the head-mounted display device occurs as the head-mounted display device is moved in opposite gravitational direction while the user is holding the head-mounted display device.

2. The method of claim 1, wherein releasing the locked state of the head-mounted display device occurs as the head-mounted display device is moved in opposite gravitational direction and remains in a stabilized state for a predetermined time while the user is holding the head-mounted display device.

3. The method of claim 1, further comprising:
   controlling the head-mounted display device to be in a locked state in response to removal of the head-mounted display device, which has been worn on the user, from the user.

4. The method of claim 3, wherein controlling the head-mounted display device to be in the locked state occurs as the head-mounted display device is moved in gravitational direction while the user is holding the head-mounted display device.

5. The method of claim 3, wherein controlling the head-mounted display device to be in the locked state occurs as the head-mounted display device is moved in gravitational direction and remains in a stabilized state for a predetermined time while the user is holding the head-mounted display device.

6. The method of claim 1, further comprising:
   determining a change of an unfolded or folded state of at least one temple frame;
   wherein controlling the head-mounted display device to be unlocked state comprises:
   controlling the head-mounted display device to be in the unlocked state in response to the change of the unfolded or folded state of the temple frame.

7. The method of claim 6, wherein controlling the head-mounted display device to be in the unlocked state comprises releasing the locked state as the head-mounted display device is moved in opposite gravitational direction while the at least one temple frame is in the unfolded state.

8. The method of claim 6, wherein controlling the head-mounted display device to be in the unlocked state comprises releasing the locked state as the head-mounted display device is moved in opposite gravitational direction and remains in a stabilized state for a predetermined time while the at least one temple frame is in the unfolded state.

9. The method of claim 6, further comprising controlling the head-mounted display device to be in the locked state as the head-mounted display device is moved in opposite gravitational direction and the at least one temple frame is in the folded state.

10. The method of claim 6, further comprising controlling the head-mounted display device to be in the locked state as the head-mounted display device is moved in opposite gravitational direction, while the at least one temple frame is in the folded state, and remains in a stabilized state for a predetermined time.

11. A head-mounted display device comprising:
    a device housing comprising a front frame provided on a front surface of the head-mounted display device and configured to receive at least one window;

an input/output unit configured to detect a user touch input generated on the device housing;

a sensor unit configured to detect motion information of the head-mounted display device; and a control unit configured to determine whether a user of the head-mounted display device is holding the head-mounted display device based on the user touch input on the device housing, to control the sensor unit to detection motion information of the head-mounted display device while the user is holding the head-mounted display device, to control the head-mounted display device to be unlocked based on the motion information, to release a locked state of the head-mounted display device in response to wearing of the head-mounted display device by the user, and to release a locked state of the head-mounted display device as the head-mounted display device is moved in opposite gravitational direction while the user is holding the head-mounted display device.

12. The head-mounted display device of claim 11, wherein the control unit is configured to release a locked state of the head-mounted display device as the head-mounted display device is moved in opposite gravitational direction and remains in a stabilized state for a predetermined time while the user is holding the head-mounted display device.

13. The head-mounted display device of claim 11, wherein the control unit is configured to control the head-mounted display device to be in a locked state as the head-mounted display device is moved in gravitational direction while the user is holding the head-mounted display device.

14. The head-mounted display device of claim 11, wherein the device housing further comprises a plurality of temple frames connected at least to a lateral surfaces of the front frame, wherein the control unit is configured to control the head-mounted display device to be in a locked state by reflecting a change of an unfolded or folded state of at least one of the plurality of temple frames.

15. The head-mounted display device of claim 11, wherein the device housing further comprises a plurality of temple frames connected at least to lateral surfaces of the front frame, wherein the control unit is configured to initiate operation of the sensor unit in response to detecting a touch input on at least one of the plurality of temple frames.

* * * * *